US010162565B2

(12) United States Patent
Wang et al.

(10) Patent No.: US 10,162,565 B2
(45) Date of Patent: Dec. 25, 2018

(54) DATA ERASURE OF A TARGET DEVICE

(71) Applicant: HEWLETT-PACKARD DEVELOPMENT COMPANY, L.P., Houston, TX (US)

(72) Inventors: Lan Wang, Houston, TX (US); Wei-Ze Liu, Houston, TX (US); Quoc P Pham, Houston, TX (US); James Robert Waldron, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/030,287

(22) PCT Filed: Jan. 30, 2014

(86) PCT No.: PCT/US2014/013743
§ 371 (c)(1),
(2) Date: Apr. 18, 2016

(87) PCT Pub. No.: WO2015/116082
PCT Pub. Date: Aug. 6, 2015

(65) Prior Publication Data
US 2016/0328180 A1    Nov. 10, 2016

(51) Int. Cl.
*H04L 29/00* (2006.01)
*G06F 3/06* (2006.01)
(Continued)

(52) U.S. Cl.
CPC .......... *G06F 3/0652* (2013.01); *G06F 3/0608* (2013.01); *G06F 3/0622* (2013.01);
(Continued)

(58) Field of Classification Search
CPC ..... G06F 3/0652; G06F 3/0608; H04L 9/3247
(Continued)

(56) References Cited

U.S. PATENT DOCUMENTS 5,892,906 A     4/1999   Chou et al.
7,584,201 B2 *   9/2009   Casey ................. G06F 21/6209
(Continued)

FOREIGN PATENT DOCUMENTS

CN         1713159       12/2005
CN         102460458      5/2012
(Continued)

OTHER PUBLICATIONS

Lendino, J., How to Remotely Disable Your Lost or Stolen Phone, (Web Page), Apr. 12, 2012, 5 pps. http://www.pcmag.com/article2/0,2817,2352755,00.asp.
(Continued)

*Primary Examiner* — Anthony D Brown
*Assistant Examiner* — Michael D Anderson
(74) *Attorney, Agent, or Firm* — HPI Patent Department (57) ABSTRACT

Examples herein disclose erasing data from a target device based upon an authentication of an erase command. The examples receive an erase command during execution to boot strap information and authenticate the erase command. Upon the authentication of the erase command, the examples erase data from the target device prior to completion of execution of boot strap information.

18 Claims, 6 Drawing Sheets

(51) Int. Cl.
*G06F 13/14* (2006.01)
*G06F 9/4401* (2018.01)
*G06F 21/57* (2013.01)
*G06F 21/44* (2013.01)
*G06F 21/60* (2013.01)
*H04L 9/32* (2006.01)
*H04L 29/06* (2006.01)

(52) U.S. Cl.
CPC .......... *G06F 3/0632* (2013.01); *G06F 3/0683* (2013.01); *G06F 9/4401* (2013.01); *G06F 9/4406* (2013.01); *G06F 13/14* (2013.01); *G06F 21/44* (2013.01); *G06F 21/57* (2013.01); *G06F 21/602* (2013.01); *H04L 9/3247* (2013.01); *H04L 63/061* (2013.01)

(58) Field of Classification Search
USPC .......................................................... 713/171
See application file for complete search history.

(56) References Cited

U.S. PATENT DOCUMENTS

| | | | |
|---|---|---|---|
| 2005/0289289 A1 | 12/2005 | Chang | |
| 2008/0293397 A1 | 11/2008 | Gajdos et al. | |
| 2008/0294886 A1 | 11/2008 | Chang | |
| 2008/0320312 A1* | 12/2008 | Duffus | G06F 21/88 713/189 |
| 2009/0260088 A1 | 10/2009 | Quach | |
| 2010/0205421 A1 | 8/2010 | Campbell et al. | |
| 2011/0072520 A1 | 3/2011 | Bhansali et al. | |
| 2011/0113230 A1 | 5/2011 | Kaminsky et al. | |
| 2011/0138163 A1* | 6/2011 | Suginaka | G06F 9/4408 713/2 |
| 2011/0246738 A1 | 10/2011 | Nakamura et al. | |
| 2012/0017271 A1 | 1/2012 | Smith et al. | |
| 2013/0205378 A1* | 8/2013 | Oba | G06F 21/44 726/7 |
| 2013/0266140 A1 | 10/2013 | Wall et al. | |
| 2014/0082262 A1* | 3/2014 | Nachimuthu | G06F 12/00 711/103 |

FOREIGN PATENT DOCUMENTS

| | | |
|---|---|---|
| TW | 448406 | 8/2001 |
| TW | 565770 | 12/2003 |
| TW | 201108111 A1 | 3/2011 |
| WO | WO-2013048491 | 4/2013 |

OTHER PUBLICATIONS

Chin, Axiang, Android article published on Jan. 3, 2014 on the webpage at https://axiang.cc/archives/8853.

Information provided by a securities company on Dec. 30, 2012 on their website at https://web.archive.org/web/20121230022526 http://www.tachan.com.tw/about/service10.html.

* cited by examiner

DATA ERASURE OF A TARGET DEVICE

BACKGROUND

Data erasure is a process of overwriting data including electronic data residing within storage on a computing device. The data erasure process removes data while preserving assets, thus repurposing life for the computing device.

BRIEF DESCRIPTION OF THE DRAWINGS

In the accompanying drawings, like numerals refer to like components or blocks. The following detailed description references the drawings, wherein.

DETAILED DESCRIPTION

Data erasure may be performed during execution of an operating system and/or during a boot up sequence of a computing device; however this leaves residue data behind and may be inefficient as data may be viewed during the boot up sequence and/or execution of the operating system on the computing device. Additionally, data erasure may be platform specific and as such may use platform dependent hardware. For example, a particular carrier may utilize the data erasure feature, but may also use specifically designed hardware for that feature. This limits the applicability of the data erasure feature. Further, users of the computing devices may fall victims to hackers who erase data on the computing devices without permission.

To address these issues, examples disclosed herein provide a target device to perform a data erasure of storage based upon an authentication of an erase command. The examples disclose the target device including a storage with an operating system and a second storage with boot strap information. The target device also includes a processor to execute the boot strap information from the second storage and to receive an erase command from a remote source. Upon receiving the erase command, the processor authenticates the erase command for performing the data erasure. Transmitting the erase command from the remote source enables a user to initiate the data erasure from a remote location when the target device may be reported as lost and/or stolen. Performing the data erasure based on authentication of the erase command provides a security feature in the sense the erase command is authenticated prior to executing the data erasure. Authenticating the erase command provides additional security to ensure the target device is enabled for the data erasure feature. Further, authenticating the erase command prevents a third party from hacking into the remote source and arbitrarily erasing data from target devices.

Additionally, upon authentication of the erase command, the processor erases the storage prior to completion of execution of the boot strap information. The erasure of data within the storage is performed prior to execution of the operating system in a pre-boot environment such as through a basic input/output system (BIOS) or unified extensive firmware interlace (UEFI). Performing the data erasure prior to execution of the operating system and in the pre-boot environment enables an efficient and clean data erasure as once the data erasure is performed, there may be no residue data. Further this implementation provides an irrevocable erasure of data within the storage when the target device may be lost and/or stolen. Providing the irrevocable erasure of data prior to boot up of the target device prevents theft of data within the storage by including an erasure of the operating system which disables access to the data during boot up.

In another example discussed herein, the remote source provisions a cryptographic key to the target device. In this example, the target device user inputs an access code to accept the cryptographic key. The cryptographic key may include a cryptographic key pair and as such may be used to digitally sign the erase command and authenticate the erase command prior to performing the data erasure. Inputting the access code enables the secure data erasure feature in a compliant manner as the erasure of data is not provisioned without user permission.

In a further example discussed herein, the erasure of data is performed in a processor agnostic type of target device. Including the target devices as processor agnostic enables the authentication of the erase command and data erasure regardless of a platform on the target device. In this example, the erasure of data occurs within a pre-boot environment, such as during execution of the bootstrap information and/or in basic input/output (BIOS). This provides additional flexibility to the data erasure feature as the target device performs the data erasure without specially designed hardware.

In summary, examples disclosed herein provide a secure and irrevocable erasure of data within a storage component of a target device. Additionally, the examples prevent theft of data as the data erasure is performed prior to completion of execution of boot strap information.

Figure 1:
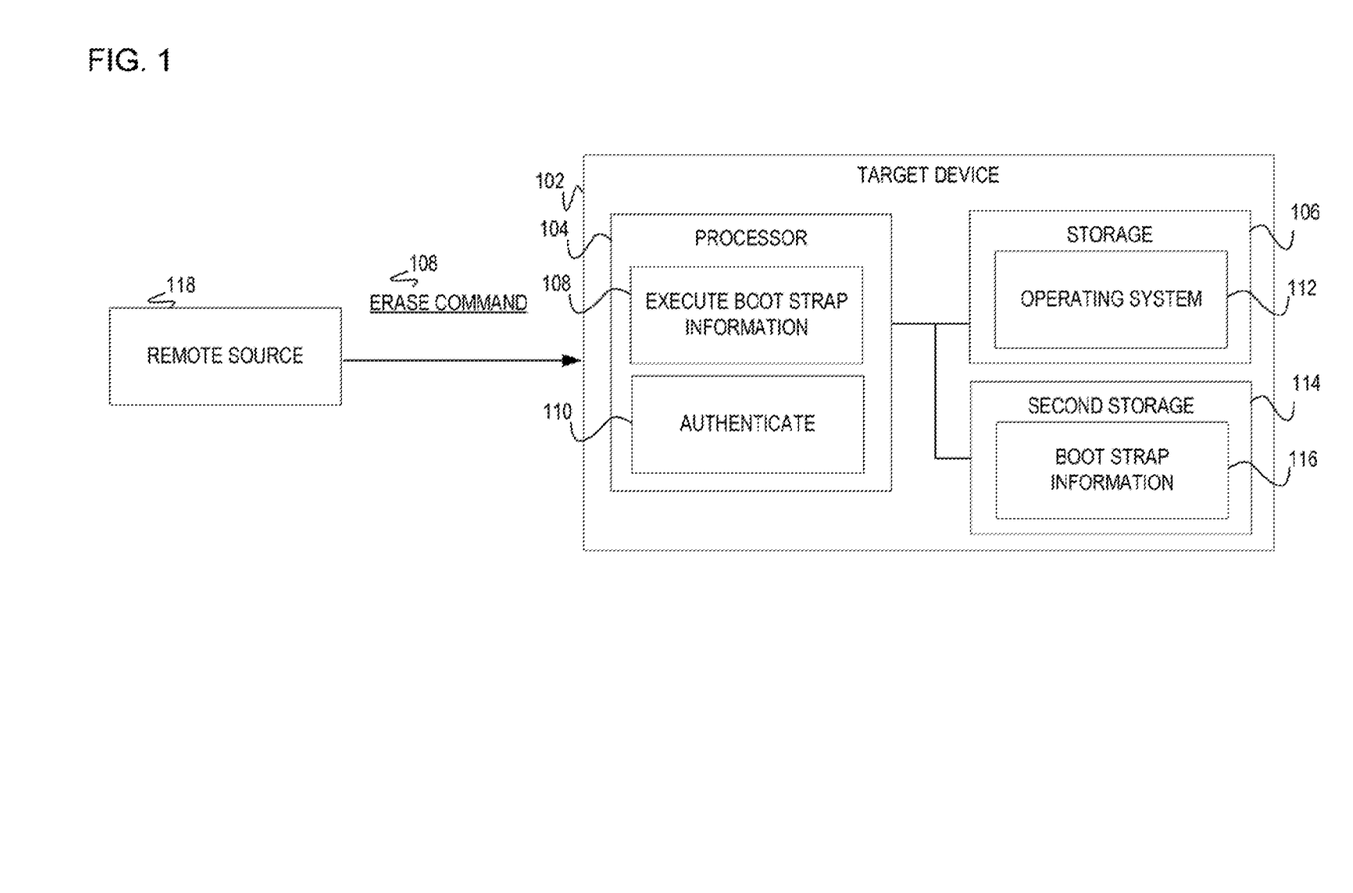
FIG. 1 is a block diagram of an example target device to receive an erase command from a remote source and authenticate the erase command for erasure of data in storage including an operating system, the data erasure occurs prior to completion of execution of boot strap information in a second storage.

Referring now to the figures, FIG. 1 is a block diagram of an example target device 102 to receive an erase command 108 from a remote source 118. The target device includes a processor 104 to execute boot strap information at module 108 from a second storage 114. The processor 104 authenticates the erase command 108 at module 110 for erasure of storage 106 including an operating system 112. The processor 104 erases the storage 106 prior to completion of execution of boot strap information 116 in the second storage 114. Boot strap information 116 is process data executable by the processor 104 for starting a computing device (e.g., the target device 102). By way of example, the boot strap information 116 may include process data for performing self-tests, loading configuration settings, loading software and/or firmware, etc. It is in this sense the computing device pulls itself up by its boot straps. In one implementation, the target device 102 performs the authentication of the erase command 108 at module 110 and erases the storage 106 during a pre-boot environment, such as during execution of a basic input/output system (BIOS). In these implementations, the erasure of the storage 106 occurs prior to boot up of the target device 102, thus providing an irrevocable erasure of the storage 106 when the target device 102 may be lost and/or stolen. Performing the irrevocable erasure of data prior to the boot up of the target device 102 prevents the theft of data within the storage 106 by wiping data from the storage which disables access to the data in the storage 106 during boot up. In a further implementation, the processor 104 erases the storage 106 prior to execution of the operating system 112, also providing irrevocable erasure of the storage 106. In yet a further implementation, the target device 102 is considered processor agnostic device in the sense the target device 102 may perform authentication of the erase command 108 and the erasure of the storage 106 regardless of a type of platform on the target device 102. For example, the authentication of the erase command 108 and the erasure of the storage 106 may include a process capable of performance on different types of platforms on the target device 102. This provides additional flexibility in performing erasure of the storage 106 on the target device 102 in the sense the process for authentication and erasure of storage 106 are independent of specifically designed hardware components within the target device 102.

The target device 102 is a computing device which is programmed to carry out a set of operations and as such may be used interchangeably with computing device throughout this document. The target device 102 is an electronic device with the processor 104 and as such implementations of the target device 102 include a computing device, mobile device, client device, personal computer, desktop computer, laptop, tablet, video game console, or other type of electronic device.

The remote source 118 transmits the erase command 108 to the target device 102. In one implementation, the remote source 118 initiates the erase command 108 when the target device 102 is reported as stolen and/or lost. For example, a user of the target device 102 may report the target device 102 as lost or stolen at which point the remote source 118 may initiate the erasure of storage 106 by transmitting the erase command 108. Although FIG. 1 illustrates the remote source 118 without any components, the remote source 118 may include a web service in which to request a cryptographic key pair. In one implementation, the remote source 118 may request to add a cryptographic key to a particular target device through the service (not illustrated). The service may then generate another cryptographic key for authentication and transmit to the remote source 118. The remote source 118 in turn may then provision the cryptographic key to the target device 102. The cryptographic key is then used at the target device 102 for authenticating the erase command 108 at module 110. In this implementation, using the service provides the ability to revoke and/or update the cryptographic key pair by modifying access to the cryptographic key pair through the service. The remote source 118 communicates with the target device 102 and/or the service over a network such as a wide area network (WAN), local area network (LAN), personal area network (PAN) mesh network, mobile device network, or other type of network capable of transmitting the ease command 108 to the target device 102. Implementations of the remote source 118 include a server, a Local Area Network (LAN) server, web server, cloud server, network server, file server, web service, or other type of computing device capable of transmitting the erase command 108.

The erase command 108 is as request transmitted to the target device 102 which may include a wipe, erasure, and/or deletion of the storage 106. In one implementation, the erase command 108 is associated with a digital signature generated by the remote source 118. In this implementation, the target device 102 receives the cryptographic key prior to receipt of the erase command 108. For authentication of the erase command 108, the target device 102 uses the cryptographic key to verify the digital signature associated with the erase command 108.

The processor 104 is a programmable electronic device and includes modules 108 and 110 to authenticate the erase command 108 and execute boot strap information from the second storage 114. Implementations of the processor 104 include a controller, electronic device, computing system, microprocessor, microchip, chipset, electronic circuit, semiconductor, microcontroller, central processing unit (CPU) or other type of processing system capable of executing boot strap information at module 108 and authenticating the erase command 108 at module 110.

Modules 108 and 110 include executing boot strap information from the second storage 114 and authenticating the erase command 108. Based upon the authentication at module 110, the processor 104 proceeds to erase storage 106. If at module 110, the authentication fails, the processor 104 does not perform erasure of storage 106. This implementation is described in detail in later figures. The modules 108 and 110 may include an instruction, set of instructions, process, operation, logic, technique, function, firmware and/or software executable by the processor 104 to execute boot strap information and authenticate the erase command 108 for erasure of storage 106.

The second storage 114 is a memory component within the target device 102 that maintains boot strap information 116. In one implementation, upon authentication of the erase command 108 at module 110, the processor 104 erases the storage 106 including the operating system 112 prior to completion of the processor 104 executing the boot strap information 116. Implementations of the second storage 114 include Random Access Memory (RAM), Read-Only Memory (ROM), solid state drive, tape drive, hard disk, flash drive, nanodrive, holographic storage device, storage drive, memory component, cache, or any combination of such storage devices capable or maintaining the boot strap information 116.

Storage 106 includes the operating system 112 and is a memory component within the target device 102 which maintains the operating system 112. The operating system 112 manages hardware components and resources within the target device 102. As such, the operating system 112 is executed to boot up the target device 112. In one implementation, the storage 106 is erased upon authentication of the erase command 108 at module 110. Implementations of storage 106 include Random Access Memory (RAM), Read-Only Memory (ROM), solid state drive, tape drive, hard disk, flash drive, nanodrive, holographic storage device, storage drive, memory component, cache, or any combination of such storage devices capable or maintaining the operating system 112.

Figure 2:
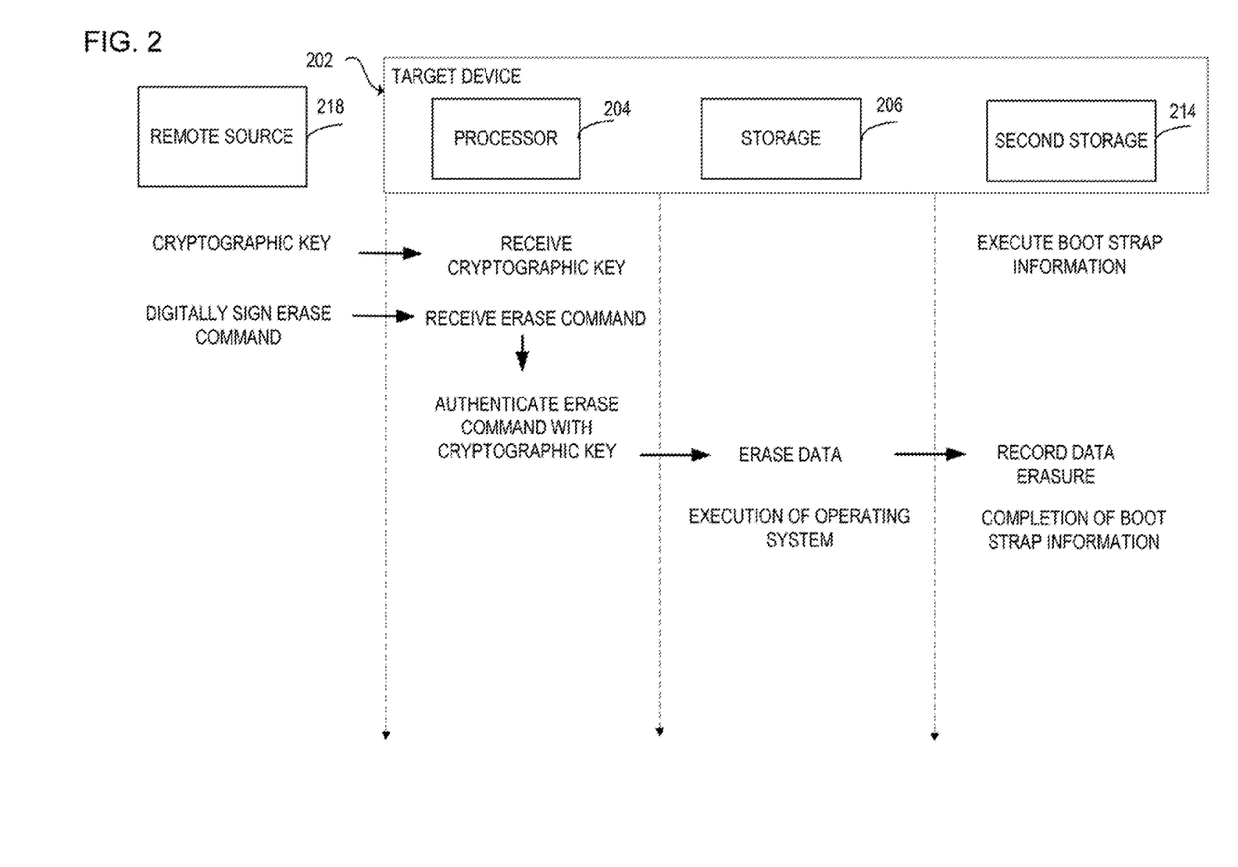
FIG. 2 is a block diagram of example communications between a remote source and a target device for authenticating an erase command by utilizing a cryptographic key pair and erasing data in storage, accordingly.

FIG. 2 is a block diagram of example communications between a remote source 218 and a target device 202 for authenticating an erase command by utilizing a cryptographic key pair and erasing data in storage, accordingly. The target device 202 includes a processor 204, storage 206, and second storage 214. As such, the remote source 218, the target device 202, the processor 204, the storage 206, and the second storage 208 are similar in structure and functionality to the remote source 118, the target device 102, the processor 104, the storage 106 and the second storage 114 as in FIG. 1.

The remote source 218 provisions a crypt graphic key to the target device 202 to accept. The remote source 218 transmits the cryptographic key to the target device 202 prior to transmitting the erase command. As illustrated in FIG. 2, the remote source 218 digitally signs the erase command and transmits the digitally signed erase command to the target device 202. The processor 204 within the target device 202 receives the digitally signed erase command and verifies the digital signature by the remote source 218 utilizing the cryptographic key received previously. During the receipt of the cryptographic key and/or the digitally signed erase command, the second storage 214 begins execution of boot strap information.

The processor 202 utilizes the cryptographic key to verify the digital signature associated with the erase command. Upon authentication of the erase command with the cryptographic key, the processor 202 communicates with the storage 206 to erase data from the storage 206. Upon a failure of authentication of the erase command, the processor 204 does not perform erasure of data within the storage 206. As noted above in connection with FIG. 1, the processor 204 communicates with the storage 206 to perform erasure of data within the storage 206 prior to completion of execution of boot strap information in second storage 214 and prior to execution of an operating system within storage 206. Upon the erasure of data within the storage 206, the second storage 214 records the erasure of data to support historical log information regarding the erasure of data. Such log history data may include job identification, receipt time of the erase command, time of erasure of data, whether the erasure of data was successful, whether the erasure of data failed, etc. In this manner, an administrator may retrieve the log history data to track the erasure of the storage 206.

Figure 3:
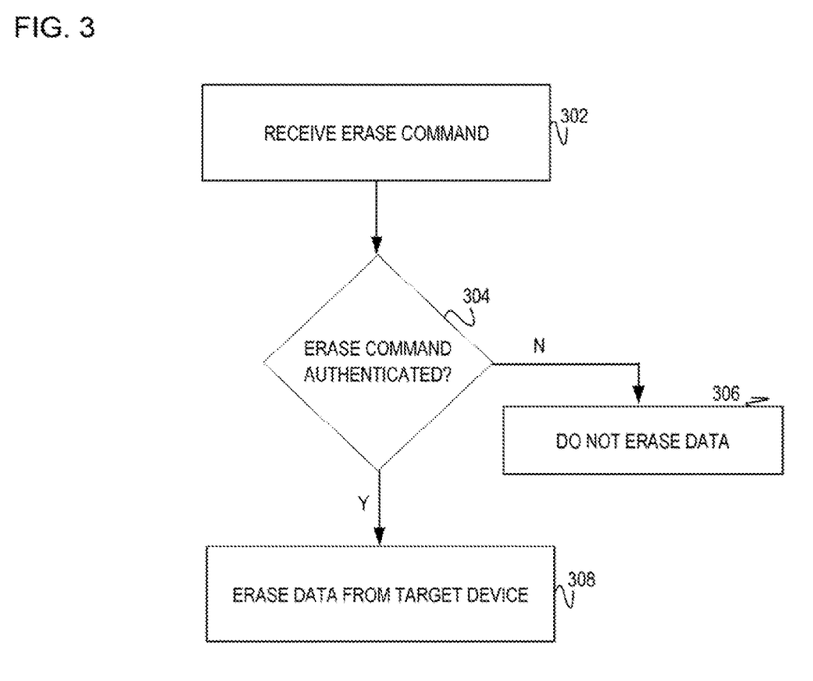
FIG. 3 is a flowchart of an example method to receive an erase command and based on the authentication of the erase command, erase data from a target device prior to completion of execution of boot strap information.

FIG. 3 is a flowchart of an example method to authenticate an erase command for erasure of data from a target device prior to execution of an operating system on the target device. The target device may be considered a processor agnostic device in the sense that the method performs the authentication and erasure of data in FIG. 3 on various platforms. For example, the method in FIG. 3 may be performed in the same manner on various types of target devices. This provides additional flexibility in performing the data erasure on the target device. In another implementation, the erasure of data from storage within the target device occurs prior to completion of execution of boot strap information. Boot strap information is a process of starting a computing device (e.g. target device). By way of example, the boot strap process may include performing self-tests, loading configuration settings, loading software and/or firmware for execution. It is in this sense the computer pulls itself up by its bootstraps. In a further implementation, the method in FIG. 3 is performed in a pre-boot environment, such as during execution of a basic input/output system (BIOS). In this implementation, the erasure of data occurs prior to boot up of the target device, thus providing an irrevocable erasure of data when the target device may be lost and/or stolen. Performing the irrevocable erasure of data prior to the boot up of the target device prevents the theft of data on the target device and thus providing an additional security feature. In discussing FIG. 3, references may be made to the components in FIGS. 1-2 to provide contextual examples. For example, processor 104 and 204 as in FIGS. 1-2 executes operations 302-308 to authenticate the erase command for erasure of data. In another example, a controller associated with the target device 102 and 202 as in FIGS. 1-2 executes operations 302-308. Further, although FIG. 3 is described as implemented by the target device, it may be executed on other suitable components. For example, FIG. 3 may be implemented in the form of executable instructions on a machine-readable storage medium 604 as in FIG. 6.

At operation 302, the target, device receives the erase command from a remote source. In one implementation, the erase command is associated with a universal unique identifier of the target device so the remote source may transmit the erase command to the particular target device. In this manner, the erase command is sent remotely from the remote source to the target device. In another implementation, the erase command is digitally signed by the remote source prior to transmission to the target device. Digitally signing the erase command enables the target device to authenticate the digital signature. In a further implementation, if the target device is lost or stolen, a user of the target device may request to wipe the target device. In this example, the remote source may transmit an erase command for receipt at the target device in operation 302. Upon receive the erase command, the method proceeds to operation 304 to authenticate the erase command.

At operation 304, the processor associated with the target device authenticates the erase command received at operation 102. Authenticating the erase command, provides the security feature to the target device through providing data erasure on enabled devices. In one implementation, the target device receives a key within the cryptographic key pair prior to receipt of the erase command at operation 302. Receiving the key enables the authentication of the erase command at operation 304. Authenticating the erase command prevents a third party from hacking into the remote source and arbitrarily erasing data from target devices. In another implementation, the erase command is digitally signed at the remote source prior to transmission at the target device. Upon receipt of the digitally signed erase command, the target device may utilize the key within the cryptographic key pair to validate the digital signature for authenticating the erase command. In these implementations, authentication of the erase command occurs with private public key pairs for authenticating the digital signature of the remote source. For example, the cryptographic key is a parameter that determines a functional output of a cryptographic cipher. In this example, the private key may be used at the remote source to produce the digital signature and public key may be used at the target device for verification of the digital signature.

Upon authenticating the erase command, the method proceeds to operation 308 to erase data from storage within the target device. If the erase command is not authenticated, the method proceeds to operation 306 and does not erase data from the target device.

At operation 306, the processor does not erase data from the target device. The method processes operation 306 upon a failure of authentication of the erase command received at operation 302. By way of example, the failure of the authentication may indicate a party requesting the erasure of data from the target device may be an unauthorized party and/or the target device may be unauthorized to perform the erasure of data.

At operation 308, the processor erases the data from the target device. In one implementation, the processor erases data from the storage on the target device. In another implementation, the erasure of data from storage within the target device. Such erasure of data may include the operating system on the target device. In another implementation, the target device may record the erasure of data to support historical log information regarding the erasure of the data. In this implementation, a primary storage within the target device is erased while a secondary storage maintains the historical log information for retrieval. This implementation is described in detail in the next figure.

Figure 4:
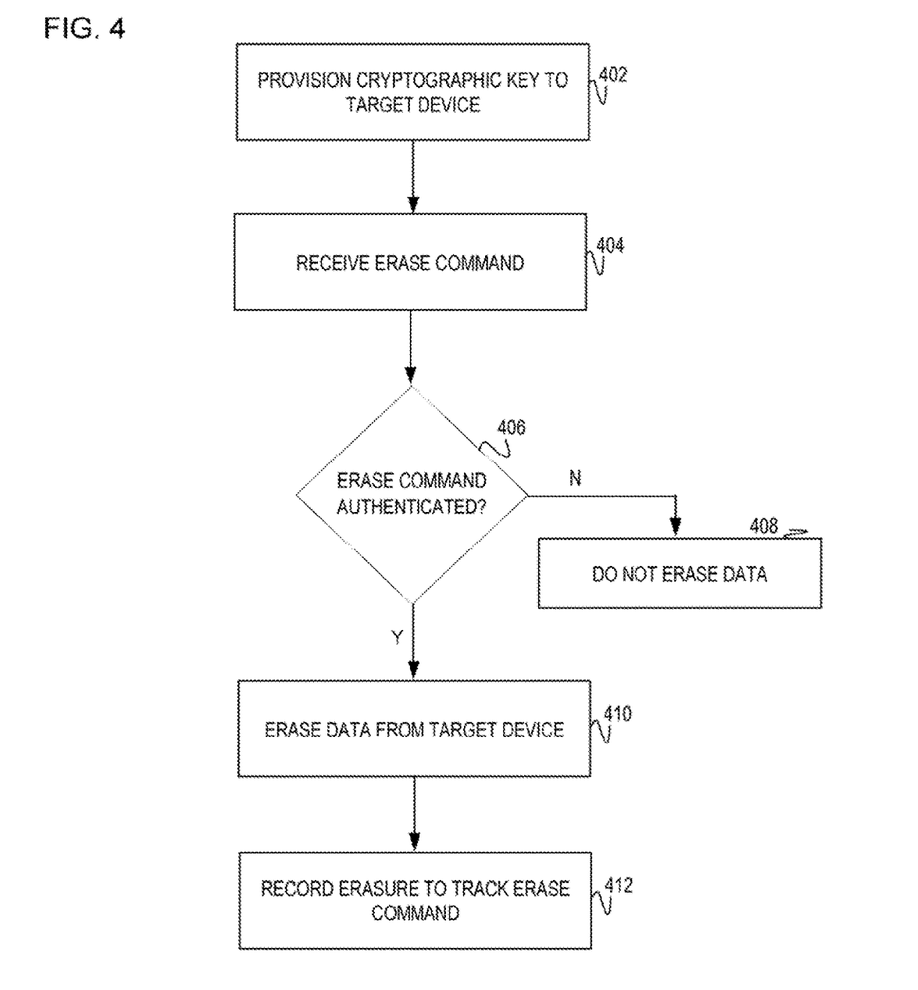
FIG. 4 is a flowchart of an example method to provision a cryptographic key from a remote source to a target device for authentication of an erase command.

FIG. 4 is a flowchart of an example method to provision a cryptographic key from a remote source to a target device. The target device initially receives a key from a cryptographic key pair from the remote source. Upon a user of the target device reporting the target device as lost or stolen, the remote source transmits an erase command to the target device. In this manner, the erase command may be sent to the target device without regard to when the target device receives the key within the cryptographic key pair. The target device utilizes the key within the cryptographic key for authentication of the erase command. Based on the authentication of the erase command, the method may proceed to erase data from the target device and record the erasure of the data. In one implementation, the erasure of data occurs prior to execution of an operating system on the target device and completion of execution of boot strap information. In another implementation, the erasure of the data occurs in a BIOS environment. The BIOS is an initial program loaded into the target device and used to load hardware configurations, etc. The BIOS runs prior to execution of an operating system and a boot-up of the target device. Enabling the erase command in the BIOS environment provides a secure erasure of data in an efficient manner. In yet a further implementation, the erasure of the data occurs in a processor agnostic type of target device. The processor agnostic type of target device indicates the erasure of data may be performed on various types of platforms on various types of target devices which provides an additional flexibility aspect. In discussing FIG. 4, references may be made to the components in FIGS. 1-2 to provide contextual examples. For example, processor 104 and 204 as in FIGS. 1-2 executes operations 402-412 to provision a key for verification of an erase command. In another example, a controller associated with the target device 102 and 202 as in FIGS. 1-2 executes operations 402-412. Further, although FIG. 4 is described as implemented by the target device, it may be executed on other suitable components. For example, FIG. 4 may be implemented in the form of executable instructions on a machine-readable storage medium 604 as in FIG. 6.

At operation 402, the remote source provisions the cryptographic key to the target device. In one implementation, the remote source may request to add a cryptographic key to the particular target device through a service. The service may then generate the cryptographic key for authentication and transmit to the remote source. The remote source in turn may then provision to the target device. In this implementation, the target device may execute firmware and/or software by the processor to enable the secure deletion feature. Upon execution or the firmware, the target device stores the key for authentication of the erase commands. Additionally, in this implementation, using the service provides the ability to revoke and/or update the key by modifying access to the key through the service.

At operation 404, the target device receives the erase command. The remote source may initiate a wipe, erasure, and/or deletion of data on the target device. In one implementation, the target device may be reported as stolen or lost, thus the remote source may initiate the erasure of data. Operation 404 may be similar in functionality to operation 302 as in FIG. 3.

At operation 406, the target device authenticates the erase command received at operation 404. In one implementation, the erase command includes the digital signature by the remote source. In this implementation, the target device may utilize a key within a cryptographic key pair to validate the digital signature, thus authenticating the erase command. Upon the authentication of the erase command, the method proceeds to operation 410 to erase data from the target device. Upon a failure of the authentication of the erase command, the method may proceed to operation 408 and does not erase data from the target device. Operation 406 may be similar in functionality to operation 304 as in FIG. 3.

At operation 408, upon the failure of the authentication of the erase command, data is not erased from the target device. As explained in reference with FIG. 3, the failure of the authentication of the erase command may indicate a party requesting the erasure of data from the target device may be an unauthorized party and/or the target may be unauthorized to perform the erasure of data. Operation 408 may be similar in functionality to operation 306 as in FIG. 3.

At operation 410, the target device erases data from itself prior to execution of the operation system. In one implementation operation 410 erases data from the target device prior to completion of an execution of bootstrap data. This implementation enables the erasure, deletion, and/or wipe of data on the target device prior to a boot of the target device. Also enabling the erasure of data from the target device may not require a user's presence. This enables the security or the target device to erase user sensitive data based upon the authentication of the erase command at the target device. Authenticating the erase command provides an additional security feature in that the data erasure feature may be enabled on the device and prevents a hacker into the remote source to erase data from target devices. The erasure of data may include erasure of data from a primary storage within the target device including the operation system, while a secondary storage may store details regarding the erasure of data at operation 412. Operation 410 may be similar in functionality to operation 308 as in FIG. 3.

At operation 412, the target device records the erasure of data for an administrator to retrieve history data for tracking the erase command. In this manner, the administrator may identify the target device in which to collect the log history data regarding the erasure of the data of the storage at operation 410. The log history data may be stored in a secondary storage. Such log history data may include a job identification, receipt time of the erase command, time of erasure of data, whether the erasure of data was successful, whether the erasure of data failed, etc. In this manner, an administrator may retrieve the log history data to track the erase command.

Figure 5:
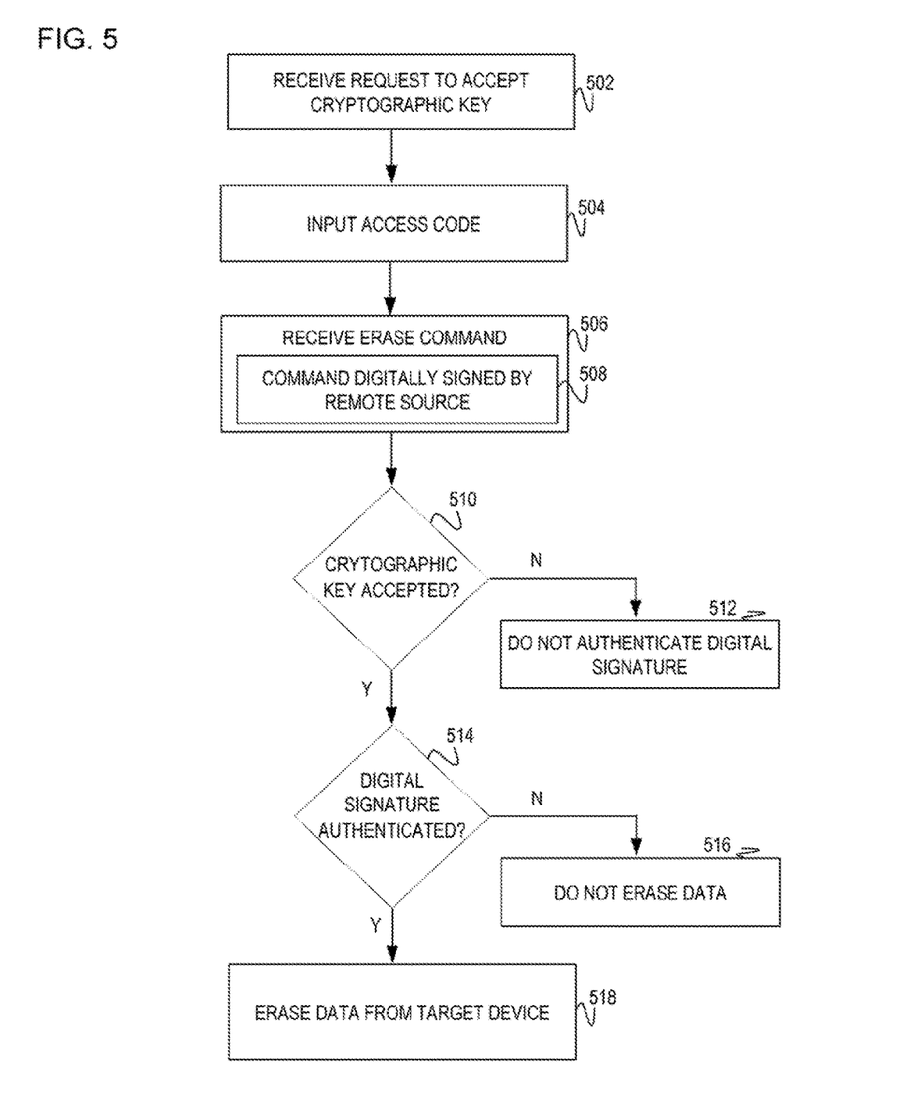
FIG. 5 is a flowchart of an example method to authenticate an erase command through a digital signature by the remote source, the digital signature associated with the erase command and the example method erases data from the target device based on a verification of the digital signature.

FIG. 5 is a flowchart of an example method to authenticate an erase command through a digital signature by at remote source and based on the authentication of the digital signature. In accordance to the authentication, the method proceeds to erase the data from a target device prior to execution of an operating system on the target device. In discussing FIG. 5, references may be made to the components in FIGS. 1-2 to provide contextual examples. For example, processor 104 and 204 as in FIGS. 1-2 executes operations 502-518 to provision a cryptographic key for verification of digital signature as part of an erase command. In another example, a controller associated with the target device 102 and 202 as in FIGS. 1-2 executes operations 502-518. Further, although FIG. 5 is described as implemented by the target device, it may be executed on other suitable components. For example, FIG. 5 may be implemented in the form of executable instructions on a machine-readable storage medium 604 as in FIG. 6.

At operation 502, the target device receives a request to accept the cryptognaphic key. In one implementation, the request to accept the cryptographic key may include an access code for input to the target device including the access code enables a user to choose to enable the data erasure security feature.

At operation 504, the access code is input into the target device to accept the cryptographic key. In one implementation, operations 502-504 include provisioning the cryptographic key to the target device. For example, a user may enter a four-digit pin number to activate the data erasure feature on the target device. If the access code is not entered or entered incorrectly, the erasure feature may not be enabled on the target device. Inputting the access code enables a user of the target device to opt out of the data erasure feature. In another implementation upon inputting the access code into the target device installs software and/or firmware on the target device which enables the data erasure feature.

At operation 506, the target device receives the erase command from the remote source. In one implementation, the erase command includes a unique identifier of the target device to transmit the erase command to the appropriate target device. In another implementation the erase command is digitally signed by the remote source as at operation 508. In a further implementation, upon receiving the erase command, the method proceeds to operations 510 and 514 to authenticate the erase command. Operation 506 may be similar in functionality to operation 302 in FIG. 3 and operation 404 as in FIG. 4.

At operation 508, the erase command is digitally signed by the remote source prior to execution of the operating system. In one implementation operation 508 occurs at the remote source prior to the transmission of the erase command to the target device. The method may proceed to operations 510 and 514 for authenticating the erase command.

At operation 510, the processor verifies whether the cryptographic key was accepted at operation 502. If the cryptographic key was accepted, the method proceeds to operation 514. If the cryptographic key was not accepted, the method proceeds to operation 512. For example, a user may choose to opt out of the data erasure feature and thus not enter an access code to enable the data erasure feature. If the cryptographic key is accepted, the method proceeds to operation 514 to verify the digital signature associated with the erase command.

At operation 512 the processor does not authenticate the digital signature as the target device is without the cryptographic key to verify the digital signature as at operation 514.

At operation 514, the processor authenticates the erase command by verify the digital signature with the cryptographic key. In this implementation, the remote source may utilize a private key to produce the digital signature with the erase command. The target source may utilize a public key to verify the digital signature and thus authenticate the erase command. Upon verification of the digital signature, the method proceeds to operation 518 to perform the data erasure. Otherwise the method proceeds to operation 516 upon failure of verification of the digital signature.

At operation 516, upon the failure of authenticating the digital signature associated with the erase command, the processor does not erase data from the target device. Operation 516 may be similar in functionality to operation 306 and 408 as in FIGS. 3-4.

At operation 518, the processor erases data the storage area within the target device prior to execution of the operating system. In one implementation, the memory including the operating system is erased from the target device. Operation 518 may be similar in functionality to operations 308 and 410 as in FIGS. 3-4.

Figure 6:
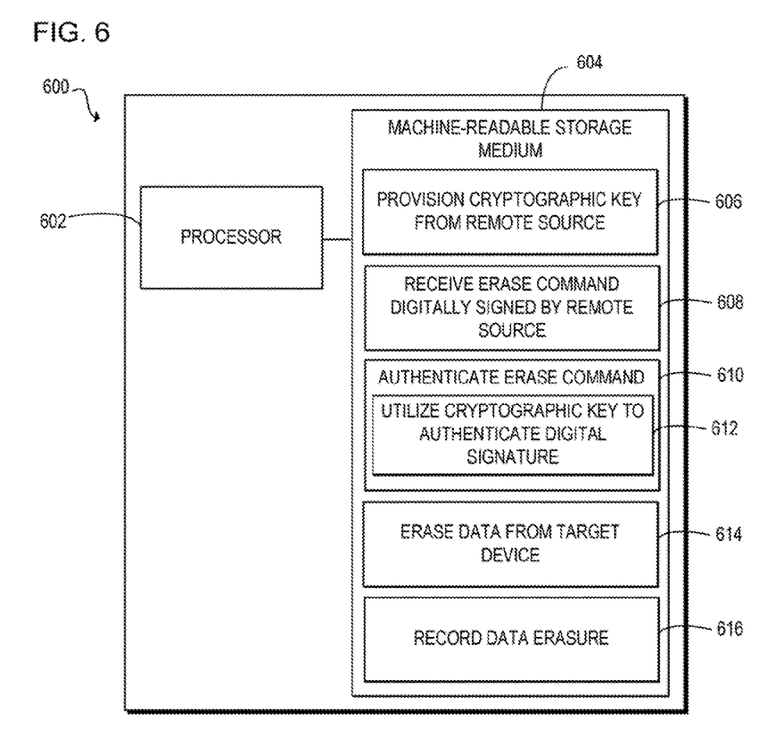
FIG. 6 is a block diagram of an example computing device with a processor to execute instructions in a machine-readable storage medium for authenticating an erase command and erasing data from storage on a target device, accordingly.

FIG. 6 is a block diagram of computing device 600 with a processor 602 to execute instructions 606-616 within a machine-readable storage medium 604. Specifically, the computing device 600 with the processor 602 is to authenticate an erase command and erase data from storage on a computing device, accordingly. Although the computing device 600 includes processor 602 and machine-readable storage medium 604, it may also include other components that would be suitable to one skilled in the art. For example, the computing device 600 may include the storage 106 as in FIG. 1. The computing device 600 is an electronic device with the processor 602 capable of executing instructions 606-616 and as such embodiments of the computing device 600 include a computing device, mobile device, client device, personal computer, desktop computer, laptop, tablet video game console, or other type of electronic device capable of executing instructions 606-616. The instructions 606-616 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-616 to authenticate an erase command through a utilization of a cryptographic key and based upon the authentication, the instructions erase the storage from the target device, accordingly. Specifically, the processor 602 executes instructions 606-608 to: provision a cryptographic key from a remote source to the target device; and receive, by the target device, the erase command which is digitally signed by the remote source. The processor 602 may then execute instruction 610-612 to: receive the erase command from the remote source, the erase command is digitally signed by the remote source; and utilize the cryptographic key to authenticate the digital signature associated with the erase command. The processor 602 may then execute instructions 614-616 to: erase data from the storage area within the target device based upon the authentication of the digital signature at instruction 612; and record the data erasure from the storage area at instruction 616. The data erasure occurs prior to an execution of an operation system on the target device. In one implementation, the instructions 606-616 may be processed in the processor agnostic system. The processor agnostic type of system means the authentication of the erase command for the erasure of data is performed the same on different platforms. Meaning, the authentication and erasure of data is performed the same on different operating system and different target devices. This enables secure remote erasure in a flexible system. Additionally, erasing data within storage on the target device prior to execution of the operation system provides an additional security feature in that data is erased prior to the execution of the operating system.

The machine-readable storage medium 604 includes instructions 606-616 for the processor 602 to fetch, decode, and execute. In another embodiment, the machine-readable storage medium 604 may be an electronic, magnetic, optical memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored an another location of the computing device 600.

In summary, examples disclosed herein provide a secure and irrevocable erasure of data within a storage component of a target device.

We claim:

1. A target device comprising:
a first storage including an operating system;
a second storage including boot strap information; and
a processor to:
  execute the boot strap information;
  in response to receiving an erase command over a network from a remote source, authenticate the erase command; and
  in response to the authenticating of the erase command, erase the first storage prior to completion of the executing of the boot strap information, the erasing of the first storage comprising erasing the operating system.

2. The target device of claim 1, wherein the processor is to erase the first storage in response to the authenticating of the erase command during execution of one of: a Basic Input/Output System (BIOS), and a Unified Extensible Firmware Interface (UEFI).

3. The target device of claim 1, wherein the erase command received from the remote source over the network is digitally signed for authentication at the target device.

4. The target device of claim 1, wherein the erasing of the first storage is processor agnostic.

5. The target device of claim 1, wherein the processor is further to:
receive a key from the remote source, wherein the erase command is authenticated using the key.

6. The target device of claim 1, wherein the processor is to store a record of an execution of the erase command in the second storage.

7. A method executed by a target device, the method comprising:
receiving an erase command during execution of boot strap information;
provisioning a cryptographic key at the target device prior to receiving the erase command;
authenticating the erase command, wherein the authenticating of the erase command is based on the cryptographic key; and
upon the authentication of the erase command, erasing data from the target device prior to completion of execution of the boot strap information.

8. The method of claim 7, further comprising:
recording the erasing of the data to track the erase command, wherein the erasing of the data is performed in a pre-boot environment.

9. The method of claim 7, wherein the erase command includes a universal unique identifier of the target device, and the erasing of data from the target device includes erasing an operating system from a storage of the target device.

10. The method of claim 7, further comprising:
receiving a request to accept the cryptographic key by the target device prior to receiving the erase command; and
inputting an access code for the acceptance of the cryptographic key on the target device.

11. The method of claim 7, wherein the target device authenticates the erase command utilizing private and public key-pair signature validation.

12. The method of claim 7, wherein the erase command includes a digital signature, and the authenticating of the erase command comprises authenticating the digital signature with the cryptographic key on the target device.

13. A non-transitory machine-readable storage medium comprising instructions that when executed cause a target device to:
execute boot strap information;
receive an erase command digitally signed by a remote source;
authenticate the erase command through the digital signature; and
in response to the authenticating of the erase command, erase data from the target device prior to execution of an operating system on the target device, wherein the erasing of the data from the target device comprises erasing the operating system.

14. The non-transitory machine-readable storage medium of claim 13, wherein the instructions when executed cause the target device to:
provision a cryptographic key from the remote source at the target device prior to receipt of the erase command;
utilize the cryptographic key to authenticate the digital signature as part of the authenticating of the erase command.

15. The target device of claim 1, wherein the authenticating of the erase command is based on a cryptographic key, and the erasing of the first storage in response to the authenticating of the erase command based on the cryptographic key is performed in a pre-boot environment before completion of a boot of the target device.

16. The target device of claim 1, wherein the erase command is received from the remote source responsive to the remote source receiving a report of loss of the target device.

17. The method of claim 7, wherein the erase command is received by the target device from a remote source over a network.

18. The non-transitory machine-readable storage medium of claim 13, wherein the erase command is received by the target device from the remote source over a network.

* * * * *